United States Patent
Eyole et al.

(10) Patent No.: US 12,260,221 B2
(45) Date of Patent: Mar. 25, 2025

(54) CIRCUITRY AND METHOD FOR INSTRUCTION EXECUTION IN DEPENDENCE UPON TRIGGER CONDITIONS

(71) Applicant: Arm Limited, Cambridge (GB)

(72) Inventors: Mbou Eyole, Soham (GB); Giacomo Gabrielli, Cambridge (GB); Balaji Venu, Cambridge (GB)

(73) Assignee: Arm Limited, Cambridge (GB)

( * ) Notice: Subject to any disclaimer, the term of this patent is extended or adjusted under 35 U.S.C. 154(b) by 60 days.

(21) Appl. No.: 18/261,966

(22) PCT Filed: Jan. 19, 2022

(86) PCT No.: PCT/GB2022/050149
§ 371 (c)(1),
(2) Date: Jul. 18, 2023

(87) PCT Pub. No.: WO2022/162344
PCT Pub. Date: Aug. 4, 2022

(65) Prior Publication Data
US 2024/0220269 A1    Jul. 4, 2024

(30) Foreign Application Priority Data
Jan. 28, 2021   (GB) .................................... 2101152

(51) Int. Cl.
*G06F 9/38* (2018.01)
(52) U.S. Cl.
CPC .............. *G06F 9/3853* (2013.01); *G06F 9/38* (2013.01); *G06F 9/3858* (2023.08)

(58) Field of Classification Search
CPC ........ G06F 9/3853; G06F 9/38; G06F 9/3858; G06F 9/30072; G06F 9/30094;
(Continued)

(56) References Cited

U.S. PATENT DOCUMENTS

2015/0012729 A1*  1/2015  Robison ................... G06F 8/41
                                                              712/216
2018/0357065 A1* 12/2018  Bhartia ................. G06F 9/3814

FOREIGN PATENT DOCUMENTS

WO      2013101187 A1   7/2013

OTHER PUBLICATIONS

Combined Search and Examination Report for an International Application No. GB2101152.3, dated Oct. 22, 2021.
(Continued)

*Primary Examiner* — Shawn Doman
(74) *Attorney, Agent, or Firm* — NIXON & VANDERHYE P.C.

(57) ABSTRACT

Circuitry comprises processing circuitry configured to execute program instructions in dependence upon respective trigger conditions matching a current trigger state and to set a next trigger state in response to program instruction execution; the processing circuitry comprising: instruction storage configured to selectively provide a group of two or more program instructions for execution in parallel; and trigger circuitry responsive to the generation of a trigger state by execution of program instructions and to a trigger condition associated with a given group of program instructions, to control the instruction storage to provide program instructions of the given group of program instructions for execution.

17 Claims, 10 Drawing Sheets

(58) Field of Classification Search
CPC .. G06F 9/30101; G06F 9/3012; G06F 9/3814; G06F 9/3822; G06F 9/3836; G06F 9/3891; G06F 15/17381; G06F 15/7825; G06F 15/82; G06F 9/30; G06F 15/80
See application file for complete search history.

(56) References Cited

OTHER PUBLICATIONS

International Search Report for an International Application No. PCT/GB2022/050149, dated Mar. 14, 2022.
Robert Bedicheck, "Some Efficient Architecture Simulation Techniques," Department of Computer Science, University of Washington, Seattle, Washington.
Angshuman Parashar et al., "Efficient Spatial Processing Element Control via Triggered Instructions," Jan. 6, 2021, p. 120-137.
Li Wang et al., "Profile Guided Optimization for Dataflow Predication."
Junbin Wang et al., "Asseleration of Control Flows on Reconfigurable Architecture with a Composite Method," Oct. 18, 2021, p. 273-278.

* cited by examiner

CIRCUITRY AND METHOD FOR INSTRUCTION EXECUTION IN DEPENDENCE UPON TRIGGER CONDITIONS

BACKGROUND

This disclosure relates to circuitry and methods.

So-called "spatial architectures" can accelerate applications by unrolling or unfolding specific computations, which can form time-consuming portions of an application's execution, primarily in "space" rather than in time.

Computations are unrolled in "space" by using a multitude of hardware units capable of concurrent operation. In addition to taking advantage of the concurrency opportunities offered by disaggregated applications which have been spread out on a chip, spatial architectures also take advantage of distributed on-chip memories—so that each processing element is associated with one or more memory blocks in close proximity to it. As a result, spatial architectures can alleviate the so-called von-Neumann bottleneck which affects many traditional architectures and which potentially hinders performance.

The present disclosure concerns potential improvements in such arrangements.

SUMMARY

In an example arrangement there is provided circuitry comprising:

processing circuitry configured to execute program instructions in dependence upon respective trigger conditions matching a current trigger state and to set a next trigger state in response to program instruction execution; the processing circuitry comprising:

instruction storage configured to selectively provide a group of two or more program instructions for execution in parallel; and trigger circuitry responsive to the generation of a trigger state by execution of program instructions and to a trigger condition associated with a given group of program instructions, to control the instruction storage to provide program instructions of the given group of program instructions for execution.

In another example arrangement there is provided a processing array comprising: an array of such circuitries; and data communications circuitry to communicate data between circuitries of the array.

In another example arrangement there is provided a method comprising:

executing program instructions in dependence upon respective trigger conditions matching a current trigger state and to set a next trigger state in response to execution of a program instruction;

providing, by instruction storage, a group of two or more program instructions for execution in parallel; and in response to the generation of a trigger state by the execution of program instructions and to a trigger condition associated with a given group of program instructions, controlling the instruction storage to provide program instructions of the given group of program instructions for execution.

In another example arrangement there is provided a computer-implemented method comprising:

generating program instructions for execution in dependence upon respective trigger conditions, execution of a program instruction setting a next trigger condition;

partitioning the program instructions into groups of program instructions, at least some groups containing more than one program instruction in which a program instruction within a given group does not depend on the outcome of another program instruction in the given group; and generating an input trigger condition and an output trigger state for each group; the input trigger condition being a condition which, when fulfilled, enables execution of the program instructions of that group, and the output trigger condition being a condition for generation in response to completion of execution of all of the program instructions in that group.

In another example arrangement there is provided a compiler comprising computer program code which, when executed by a computer, causes the computer to perform the method defined above.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Example Processing Array

Figure 1:
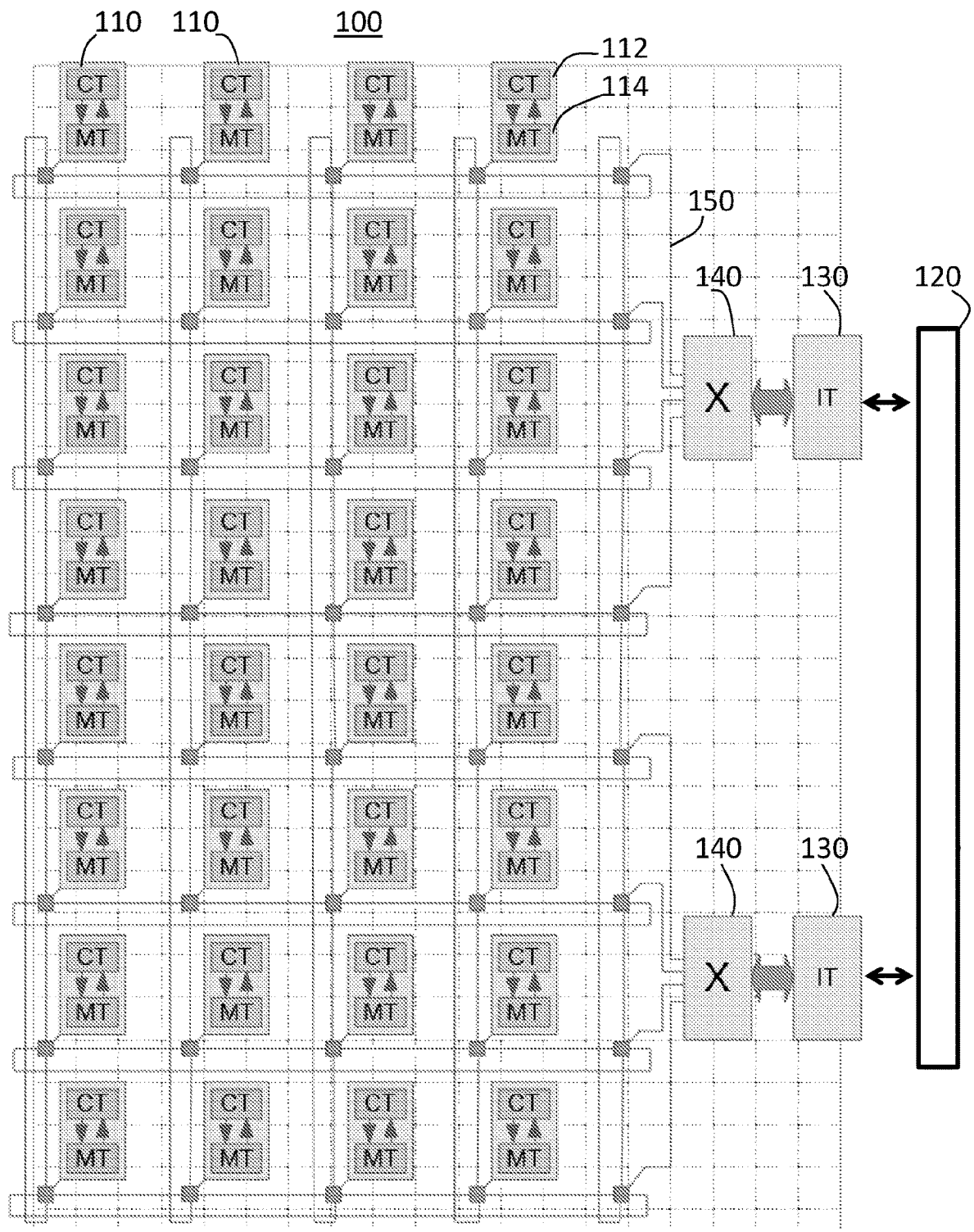
FIG. 1 schematically illustrates an example array of processing circuitries.

Referring to the drawings, an example instance of a spatial architecture is shown schematically in FIG. 1.

In this example arrangement, a two-dimensional array 100 of data processing elements 110 is connected to memory arrangement 120 such as a cache hierarchy or main memory via data transfer units 130 called Interface Tiles (IT).

There are two kinds of data processing elements in this example of a spatial architecture: so-called Compute Tiles (CT) 112 which perform the bulk of the data processing operations and arithmetic computations and so-called Memory Tiles (MT) 114 which are primarily responsible for data accesses to locally connected memory and data transfers to/from the more remote memory regions and other processing elements.

In example embodiments, there is provided a local memory block (not shown in FIG. 1 but described below with reference to FIG. 3), also called a scratchpad, connected to or associated with each Memory Tile (MT), and each MT has direct connections to one respective Compute Tile (CT).

Each MT-CT cluster represents a data processing element 110 and such elements are connected via a switch 140 (also referred to as a router in some examples) to a network-on-chip 150 representing an example of data Communications circuitry to communicate data between circuitries 110 of the array 100 and which is used in this example to transfer data between MTs and between each MT and the Interface Tile (IT) 130. However, other configurations are possible such as having a single scratchpad shared between several MTs or having an MT which has direct access to more than one scratchpad. The one-to-one correspondence between the CTs and MTs is also not mandatory in the architecture and it could be the case that one MT is connected to more than one CT or vice versa. In other words the processing elements are each connected via a set of input and output channels to the network-on-chip which comprises switches, and data links between these switches, forming a two-dimensional torus layout as depicted in FIG. 1.

First-in-first-out (FIFO) buffers, not shown in FIG. 1 but described with reference to FIGS. 2 and 3 below, referred to as "channels" are used to deliver data to CTs and MTs and carry processed data away from them.

The architecture of the CTs and MTs is based on a so-called Triggered Instruction Architecture [see Reference 1 cited below] which has been extended to support vector processing, and more advanced data transfer operations.

Triggered Operation

In some examples, each instruction has or is associated with a set of one or more "trigger conditions" and it will be issued or sent to an execution unit only when those trigger conditions are valid, which is to say that the trigger condition matches a trigger state generated by execution of another program instruction. Indeed, the execution of a program instruction is not only dependent upon a respective trigger condition matching a current trigger state but also can itself set a next trigger state.

The trigger conditions are specific to a particular circuitry 110 and can depend on execution results, channel occupancy, or some other prescribed state of a processing element. Upon completion, each instruction can set one or more predicate registers which influence triggers and, therefore, can subsequently be used to determine whether other instructions are ready for execution. Notably, this type or architecture typically has no explicit program counter and no dedicated branch instructions. Its key advantages are the ensuing simplification of the front-end circuitry of the processing elements, and the avoidance of pipeline bubbles due to control-flow hazards without resorting to complex branch prediction mechanisms.

Triggered Instructions—Example Format

In general, triggered instructions have the following format:

<operation> <destination_operand>, <source_operand1>, <source_operand2> ; <predicate_set_operation> : when <trigger_condition>

The destination and source operands can be vector registers, scalar registers, predicates, or channels. In other words, the executed instructions can be scalar instructions, vector instructions (in which case the circuitries 110, or at least some of them, may comprise vector processing circuitry configured to execute a vector processing instructions, each vector processing instruction applying a respective processing operation to a respective vector of two or more data elements).

So, by way of example, the following instruction may be used:

add z2, ich2, ich3 ; set p = 1010 : when p == 1001 which performs an addition ("add") of two source operands residing at the heads of input channels "ich2" and "ich3" respectively and writes the result to vector register "z2". This instruction is triggered when the state of the predicates is "1001" and upon completion it sets the predicates collectively to "1010" which would then cause another instruction whose trigger conditions match this state to become ready for execution.

The predicates may be maintained in, for example, a predicate store or register 212 at the execution circuitry 210 and which is readable by the trigger circuitry 250, which also receives information from the queue 240 defining the trigger conditions associated with queued program instructions (which trigger conditions in turn may have been generated for populating the queue by compilation operations). So, in the example given above, the detection of the condition "when p==1001" is performed as follows:

the queue 240 provides the trigger condition "p==1001" to the trigger circuitry 250 (along with trigger conditions applicable to other queued instructions);

the trigger circuitry 250 is in communication with the predicate storage 212;

the trigger circuitry 250 detects when the predicate stored by the predicate storage 212 is equal to 1001;

in response, the trigger circuitry issues a control signal to the queue 240 to prompt the queue to issue the associated instruction "add z2, ich2, ich3; set p=1010" for decoding and execution;

In response to completion of execution of this instruction, the execution circuitry 210 sets the predicate held by the predicate storage 212 to the new value of 1010. The process outlined above is followed again with the trigger circuitry detecting a match between this new predicate value and the trigger condition (communicated by the queue 240) associated with another queued instruction. The process follows a chain of trigger states matching next trigger conditions as established at the compilation of the program code.

Note that the predicate storage 212 could be provided at the trigger circuitry 250 or as a separate circuitry item writable by the execution circuitry 210 and readable by the trigger circuitry 250.

There are a number of constraints on the amount of computation which can be performed at any given location within a spatial architecture. Such constraints could be the rate at which data can be delivered or removed from certain locations and power or thermal constraints. As a result, some example embodiments may act to adapt the amount of processing performed at a given location depending on the available network or data transfer bandwidth, for example.

Example embodiments of the present disclosure can provide additional configuration options which may potentially provide more parallelism opportunities and may potentially make it easier to balance the ratio of compute to network or memory bandwidth.

Example Compute Tile

Figure 2:
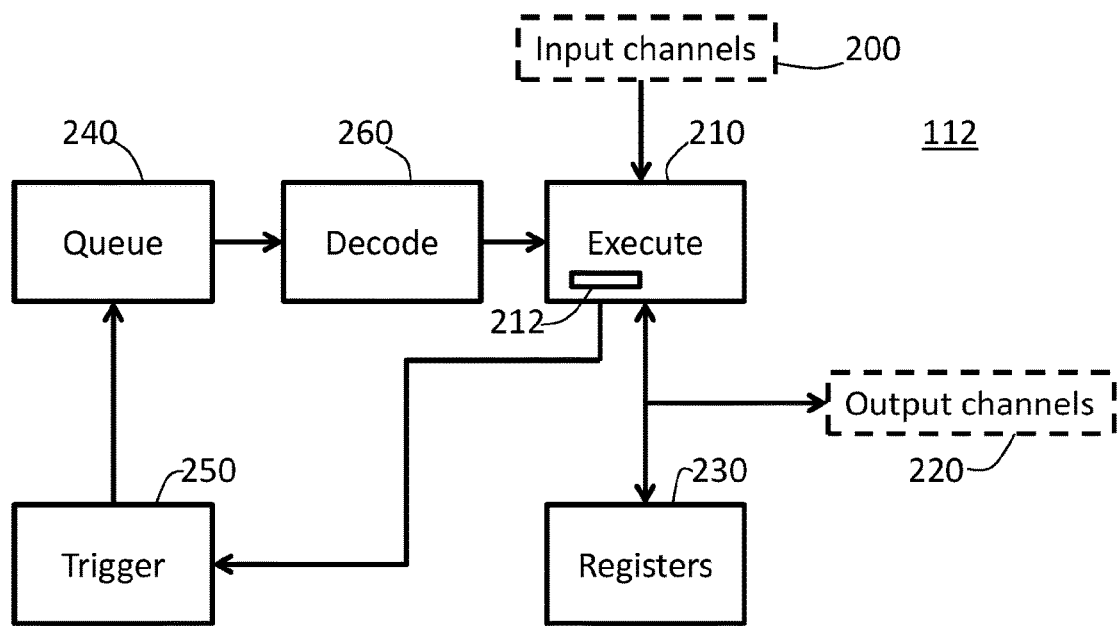
FIG. 2 schematically illustrates a compute tile.

FIG. 2 provides a generic example of a compute tile 112 which, as mentioned above, may act on scaler and/or vector instructions.

One or more FIFO elements 200 act as input channels provide an input to execution circuitry 210 and one or more FIFO elements 220 act as output channels as discussed above. Execution is performed by the execution circuitry 210 with respect to one or more processor registers 230.

An instruction queue provides an example of instruction storage to provide program instructions for execution. The program instructions are provided in response to trigger circuitry 250 which is responsive to the generation of the trigger state by execution of program instructions (for example, previously executed program instructions) and to a trigger condition associated with an instruction held by the queue 240, to control the queue 240 to provide a program instruction for execution. A program instruction issued by the queue 240 is decoded by decode circuitry 260 before being passed the execution circuitry 210.

Example Memory Tile

Figure 3:
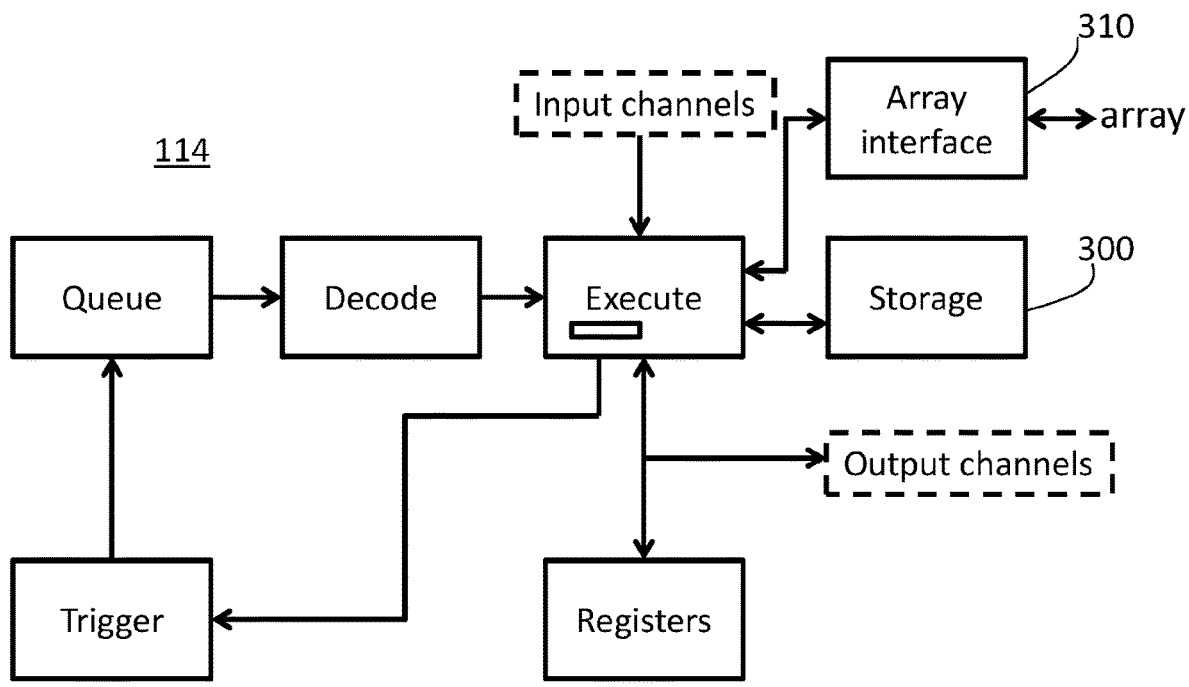
FIG. 3 schematically illustrates a memory tile.

The generic schematic presentation of the MT 114 in FIG. 3 is substantially the same as that of the CT in FIG. 2 with the following exceptions:
(a) a "Storage" block or circuitry 300 is connected to the execution circuitry; and
(b) an "Array interface" block or circuitry 310, comprising an interface to the communications circuitry 150, is connected to the execution circuitry.

Otherwise, the operation of the memory tile 114 corresponds to that of the compute tile discussed above. Note that the MT uses triggered instructions like the CT, and though the execute paths might (in some examples) be simpler in the MT relative to the CT because the MT does not necessarily perform bulk data processing, it still retains enough functionality to perform address calculations, data permutations, and data transfers between the local Storage 300 and the rest of the array via the Array interface 310.

Communication of a data item between the CT 112 and the MT 114 of a circuitry 110 is via the output channel(s) of the tile sending the data item and the input channel(s) of the tile receiving the data item.

Dataflow Graphs

In the techniques to be discussed below, in order to unroll the computations within an application in space, it can be useful first to determine a dataflow graph (DFG) representing the operations within the application.

Figure 4:
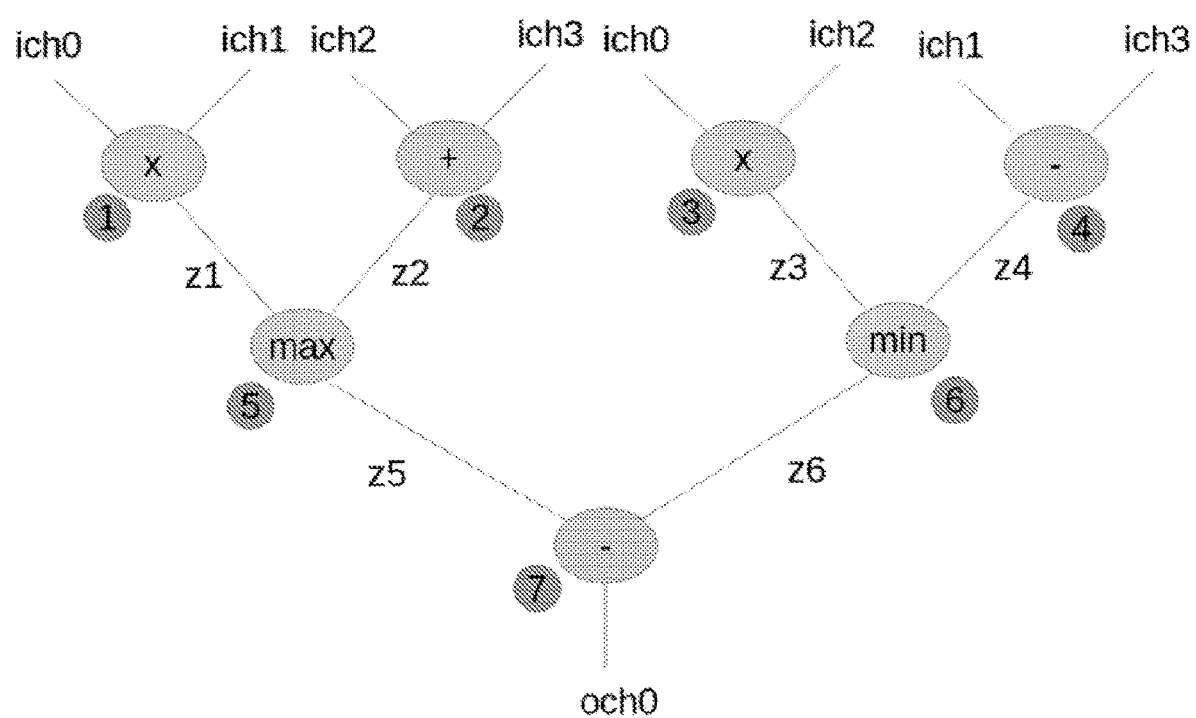
FIG. 4 schematically illustrates a dataflow graph.

An example of such a DFG is shown schematically in FIG. 4. Input channels (ich n) are represented along the top of the DFG, an output channel (och 0) is represented at the bottom of the DFG and computational operations such as multiplies (×), additions (+), subtractions (−) and maximum/minimum functions (max/min) are represented, with the input operands and output destinations of the operations being represented alongside lines schematically linking the various operations This dataflow graph can then be partitioned and distributed over the available hardware units. However, realistic DFGs tend to be larger than the available spatial resources, so some form of time-slicing eventually occurs in order to be able to map the DFG to hardware. However, in some of the present examples of spatial design, the extent of such time-slicing may be limited relative to conventional architectures.

Within spatial architectures, the total speedup observed relative to conventional architectures is derived from a mixture of instruction-level parallelism (ILP), data-level parallelism (DLP), and task-level parallelism (TLP). Task-level parallelism or building a pipeline of tasks (which are connected via data streams) may be considered to be orthogonal to the level of orchestration containing ILP and/or DLP. So, for example, task A can be placed on a set of processing elements and task B on another set (and connections made between the two sets so data produced by A can be consumed by B) and the two sets of processing elements can operate concurrently whilst each set, individually, strives to take full advantage of the ILP and/or DLP present in their portion of the DFG.

Vectorisation (enabling functional units to operate on groups of data elements simultaneously) and tiling (splitting data sets into fixed chunks which are spread over the spatial fabric) will typically enable the extraction of DLP. However, even when the system has improved opportunities for extracting DLP and TLP as described above, there might be a deficit of ILP, a potential source of parallelism that is currently not sufficiently addressed in triggered architectures. The present embodiments propose a way of efficiently instructing a processing element to act on a group of operations in parallel in a manner which enables a potentially better trade-off or balance between the compute intensity of each processing element and the available memory or network bandwidth. In any of the present embodiments, the processing circuitry may comprise therefore vector processing circuitry configured to execute two or more vector processing instructions in parallel, each vector processing instruction applying a respective processing operation to a respective vector of two or more data elements.

Overview of Proposed Techniques

An example will now be described by which the architecture extension proposed by the present disclosure can potentially extract additional parallelism.

The example relates to an application which has been partitioned into multiple smaller portions which run on plural respective processing elements. Assumed that one portion of the application or kernel has the dataflow graph shown in FIG. 4. An example will be given as to how this can be implemented in a triggered processing element.

Note that vectorisation and tiling are assumed to have already been performed in this perspective and the operations shown in FIG. 4 can (where appropriate) handle vector data sourced from input channels and can return vector data to other processing elements or memory.

Observing the DFG of FIG. 4, it is possible to note that a number of operations can be executed in parallel. That is to say, nodes at the same "level" (vertical position as drawn) of the DFG do not have any inter-dependencies and can be made to execute simultaneously with no data hazards occurring.

In the absence of the techniques proposed by the present disclosure, one previously proposed implementation of this dataflow may be as follows:

```
1    mul z1, ich0, ich1 ; set p = 1001 : when p == 1000
2    add z2, ich2, ich3 ; set p = 1010 : when p == 1001
3    mul z3, ich0, ich2 ; deq ich0, deq ich2 ; set p = 1011 : when p == 1010
4    sub z4, ich1, ich3 ; deq ich1, deq ich3 ; set p = 1100 : when p == 1011
5    max z5, z1, z2 ; set p = 1101 : when p == 1100
6    min z6, z3, z4 ; set p = 1110 : when p == 1101
7    sub och0, z5, z6 ; set p = 1111 : when p == 1110
8    sub r1, r1, #1 ; set p = 0001 : when p == 1111
9    ne p3, r1, #0 ; set p = z000 : when p == 0001
10
```

Here, "mul" represents a multiplication operation; "sub" represents a subtraction operation and "ne" represents a test for "not equal", in this case to the immediate value of zero.

The operations represented by instructions on lines 1 to 7 correspond to nodes (labelled 1 to 7) in the DFG of FIG. 4. Additionally, on lines 3 and 4, there are channel dequeue operations ("deq") which remove data items at the respective heads of the channels specified. This can occur once all relevant use has been made of the respective data.

The register r1 holds a special iteration count value which is updated (decremented by an immediate value of 1) on line 8 and a comparison instruction on line 9 is used to select between triggering the instruction on line 1 which restarts the sequence of state transitions implementing the DFG and entering some other state which presumably would indicate that all relevant values have been processed.

The "z" is used in line 9 to indicate that this particular bit is set at runtime depending on the outcome of the comparison. That is to say, the bit at position 3 will be set to 1 if r1 !=0 but if r1==0 then the bit at position 3 will be set to 0. The final predicate result will therefore be 1000 if the comparison (ne) is successful and 0000 if the check fails.

The arrangements proposed by the present disclosure can make use of arrangements in which the programmer or compiler specifies "groups" or "bundles" of one or more instructions (the two terms being considered equivalent for the purposes of the present description) which can be processed in parallel. In such arrangements a compilation or other operation may involve generating program instructions for execution in dependence upon respective trigger conditions, execution of a program instruction setting a next trigger condition; partitioning or bundling the program instructions into groups of program instructions, at least some groups containing more than one program instruction in which a program instruction within a given group does not depend on the outcome of another program instruction in the given group; and generating an input trigger condition and an output trigger state for each group; the input trigger condition being a condition which, when fulfilled, enables execution of the program instructions of that group, and the output trigger condition being a condition for generation in response to completion of execution of all of the program instructions in that group.

That is, the following format may be defined for specifying a bundle of instructions:

<predicates written upon completion of bundle>:when <input trigger conditions><instruction list>
. . .
//bundle-terminating asterisk In other words, rather than the trigger condition relating to initiation of a single respective instruction, and that single instruction generating a trigger state in response to its execution, in the proposed arrangements, the trigger circuitry is responsive to generation of a trigger state by execution of the bundle of instructions and to a trigger condition associated with a given bundle, to control the queue 240 to provide that bundle of instructions for execution. In other words, the generation of predicates is performed on a bundle-by-bundle basis, and the testing of predicates against trigger conditions is also performed bundle-by-bundle so that the trigger conditions are associated with bundles rather than individual instructions.

Note that it is possible for a bundle to comprise just one instruction, but in many instances a bundle may comprise more than one instruction and in any event, the present arrangements allow for trigger condition testing and trigger state generation on a bundle-by-bundle basis.

So, applying this scheme to the code above (and assuming the circuitry in use is capable of executing up to, say, four instructions in parallel) may generate the following program code. Note that software pipelining is employed in this code and there is now a prologue section (lines 1-10) used to align operations in time. Similar bundled instruction programs can also be produced by unrolling the previous code and grouping operations in the unrolled body, however, such unrolling tends to lead to code "bloat" (a term used to describe an undesirable degree of growth in the overall quantity of program instructions to perform a particular set of tasks) and is better used in scenarios where instruction space is not a critical resource.

```
1       * set p = 1010 : when p == 0010
2       mul z1, ich0, ich1
3       add z2, ich2, ich3
4       mul z3, ich0, ich2 ; deq ich0, deq ich2
5       sub z4, ich1, ich3 ; deq ich1, deq ich3
6       *
7       * set p = 1000 : when p == 1010
8       max z5, z1, z2
9       min z6, z3, z4
10      *
11
12      * set p = 1100 : when p == 1000
13      mul z1, ich0, ich1
14      add z2, ich2, ich3
15      mul z3, ich0, ich2 ; deq ich0, deq ich2
16      sub z4, ich1, ich3 ; deq ich1, deq ich3
17      *
18      * set p = 1101 : when p == 1100
19      max z5, z1, z2
20      min z6, z3, z4
21      sub och0, z5, z6
22      sub r1, r1, #1
23      *
24      ne p3, r1, #0 ; set p = z000 : when p == 1101
```

Comparing this code with the DFG of FIG. 4, the following bundles of operations are defined:

operations shown on FIG. 4 as 1, 2, 3 and 4; these are defined by a bundle shown in lines 1-6 in the listing; this bundle executes when p==0010 and in response to its execution it sets p=1010;

operations shown on FIG. 4 as 5, 6; these are defined by a bundle shown in lines 7-10 in the listing; this bundle executes when p==1010 and in response to its execution it sets p=1000;

As mentioned above, these two bundles form a so-called prologue before a main loop. The execution of the bundles on lines 1-6 and lines 7-10 will provide preliminary values of z5 and z6, say: z5' and z6'. Subsequently, executing the bundles on lines 12-17 and lines 18-23 will produce new values of z5 and z6, say z5" and z6" whilst consuming the old values: z5' and z6' (see operation on line 21). This process then repeats (loops from line 24 back to line 12): that is, the operation on line 21 always consumes the values of z5 and z6 produced previously whilst the bundle (lines 18-23) generates new values of z5 and z6 for future iterations. The prologue is required to get the first pair of z5 and z6 values at the start of the sequence.

The main loop therefore comprises the following bundles:
operations shown on FIG. 4 as 1, 2, 3 and 4; these are defined by a bundle shown in lines 12-17 in the listing; this bundle executes when p==1000 and in response to its execution it sets p=1100;

operations shown on FIG. 4 as 5, 6; these are defined by a bundle shown in lines 7-10 in the listing; this bundle executes when p==1100 and in response to its execution it sets p=1101;

the loop continuation operation discussed above, expressed as a single-instruction bundle of line 23 which executes when p==1101 and sets p=z000.

The loop then branches back to line 12 i.e. when p==1000 if r1 !=0. On the other hand if r1==0 then the check fails and the code will trigger an instruction/bundle with input predicate 0000 (not shown in this listing) handling further operations outside of the DFG shown in FIG. 4.

A side-effect of the bundled trigger approach demonstrated above is that it can help reduce the number of active predicate bits or state space that must be traversed by the program leading to potential hardware improvements. Multiple instructions can take advantage of a single trigger condition thereby potentially improving the scalability of the instruction selection logic.

Furthermore, instruction bundles enable concurrency without traditional renaming operations or dependency checks or real-time operand availability tracking units which are common in conventional processors and which potentially lead to inefficiencies due to the additional complexity they introduce.

Note that all channel dequeue (or indeed enqueue) operations are deferred until after all the instructions in the bundle have completed. So, dequeue operations specified on lines 4, 5, 15 and 16 will not be performed until after the whole of the corresponding bundles have completed. In other words, the compilation of the code can comprise, for one or more input channels providing input data for execution of a group, generating one or more operations to dequeue the input data from the one or more input channels after execution of the program instructions of the group Example circuitry to be described below can ensure that instructions execute in a truly concurrent fashion so any writes to intermediate register variables will not be seen until the end of the bundle. So, for example, writes to vector registers z5 and z6 on lines 19 and 20 respectively, will not occur until after the bundle terminates so will not be seen by the "sub" operation on line 21. Multiple writes to the same destination vector register or channel within a bundle could cause non-deterministic behaviour and should ideally be detected by the compiler. Otherwise, some embodiments might generate an exception, whilst some other embodiments might provide a system register which can indicate that such a fault has occurred (and that can be used for debugging purposes).

All instructions within the bundle share the same trigger conditions, so depending on the current state of the machine they would either all proceed, or none would. So, for example, if there is data absent on input channel 3 (ich3), the "add" on line 14 and the "sub" on line 16 would naturally not be able to execute but because they have been bundled with a "mul" operation on line 13 and another "mul" on line 15, these operations would be stalled as well even though the data they operate on might in fact be available. Whilst this indirect synchronisation of the readers of multiple channels has some benefits, it might become costly for large bundles due to the increased probability of stalls. As a result, some embodiments of compilers could be operable to artificially reduce the bundle size from that specified in the code in order to glean some of the advantages of bundling whilst limiting the frequency of stalls. In some examples, bundles may be limited to the degree of parallelism provided by the circuitry used to execute the instructions, for example bundling at a maximum of four instructions in some of the examples given below.

Although multiple execution pipelines or paths present in a triggered microarchitecture capable of executing bundled instructions can operate concurrently, such pipelines might not be symmetric. As a result, a compiler or some other similar tool might be operated in some embodiments to verify that the mix of instructions in each bundle is supported by the underlying hardware. The instructions might also need to be reordered (repositioned) within the bundle to match the available hardware if certain execution "slots" or paths will only accept a limited number of instructions. Furthermore, if certain contemporaneous combinations of operations are not supported, the bundle might need to be broken up by the compiler or the triggered instruction hardware could invoke a sequencing unit which might be able to time-slice the operations within the bundle at runtime. Indeed, this could also be the case in instances where the number of instructions in a bundle is greater than the maximum supported execution (parallelism) width. It could also be the case that even though the bundle width matches the execution width, the instructions in the bundle might not all be able to make progress simultaneously due to register access restrictions in some embodiments, so some form of sequencing might be inevitable.

State transition instructions like comparisons (which write to predicate registers) are permitted within a bundle but multiple writes to the same predicate register could cause non-deterministic behaviour. In addition, the predicate set directive for the entire bundle will have a high impedance indicator in the relevant bit position (such as that shown on line 24), allowing that bit to be set by the result of one or more of the comparisons within the bundle.

In other words, If there is only 1 comparison in the bundle then something like the following example may be used:

| 1 | * set p = z101 : when p == 1111 |
|---|---|
| 2 | sub z1, z2, z3 |
| 3 | mul z7, z6, z8 |
| 4 | ne p3, r1, #0 |
| 5 | sub z0, z1, z6 |
| 6 | * |

Here the transition in bit 3 which would normally be associated with a single instruction is now associated with the entire bundle; and predicate bit "3" will only be updated upon completion of the bundle.

If there are more comparison operations within the bundle then it should be ensured that the updates are not conflicting, or in other words that the updates will be preferably applied to different predicate bits. For example:

| 1 | * set p = z10z : when p == 1111 |
|---|---|
| 2 | sub z1, z2, z3 |
| 3 | ne p0, r2, #0 |
| 4 | ne p3, r1, #0 |
| 5 | sub z0, z1, z6 |
| 6 | * |

One aspect that is worth considering is the fact that the bundle granularity may not be constant throughout a program and might even vary in a highly irregular fashion in some programs. Examining the program with bundled trigger instructions presented above, a few instances of this irregularity can be observed as the program has bundles of size 1, 2, and 4. Therefore, a hardware implementation which lays out bundles in instruction memory as they appear in the program could suffer from inefficiency or under-utilisation of certain memory regions. In this regard, reference is made to FIG. 5 which provides a schematic example of bundles of different sizes (represented by a first shading 500 and corresponding under-utilised or wasted memory regions represented by a second shading 510 in each case.

Figure 6:
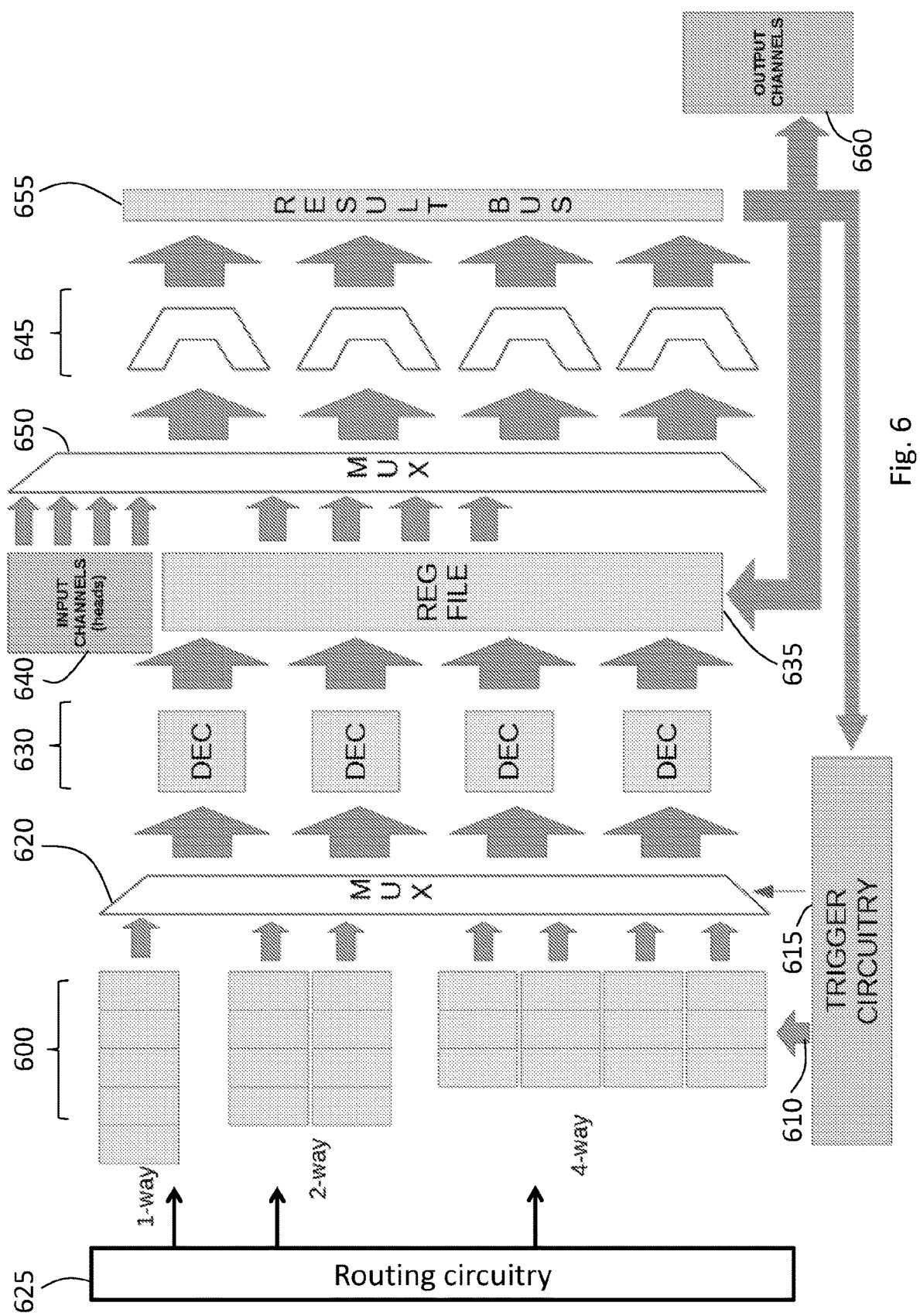
FIGS. 6 to 8 schematically illustrate respective circuitries.

Given that each triggered instruction encompasses a multi-way state transition operation, they do not necessarily need to be placed sequentially in instruction memory, but they can be freely rearranged. As a result, example embodiments propose the organisation of instruction memory shown in FIG. 6 to enable potentially more efficient storage of bundled instructions. FIG. 6 shows one example embodiment of a processing element in a spatial triggered architecture which supports instruction-bundling.

The arrangement of FIG. 6 (and indeed that of FIG. 7 or 8) can represent a compute tile and/or aspects of a memory tile (other than the storage and the array interface) as discussed above, or in other words circuitry at one node of the array of FIG. 1. A compilation operation can involve routing a group of program instructions to an individual processor of an array of such processors or circuitries.

Figure 5:
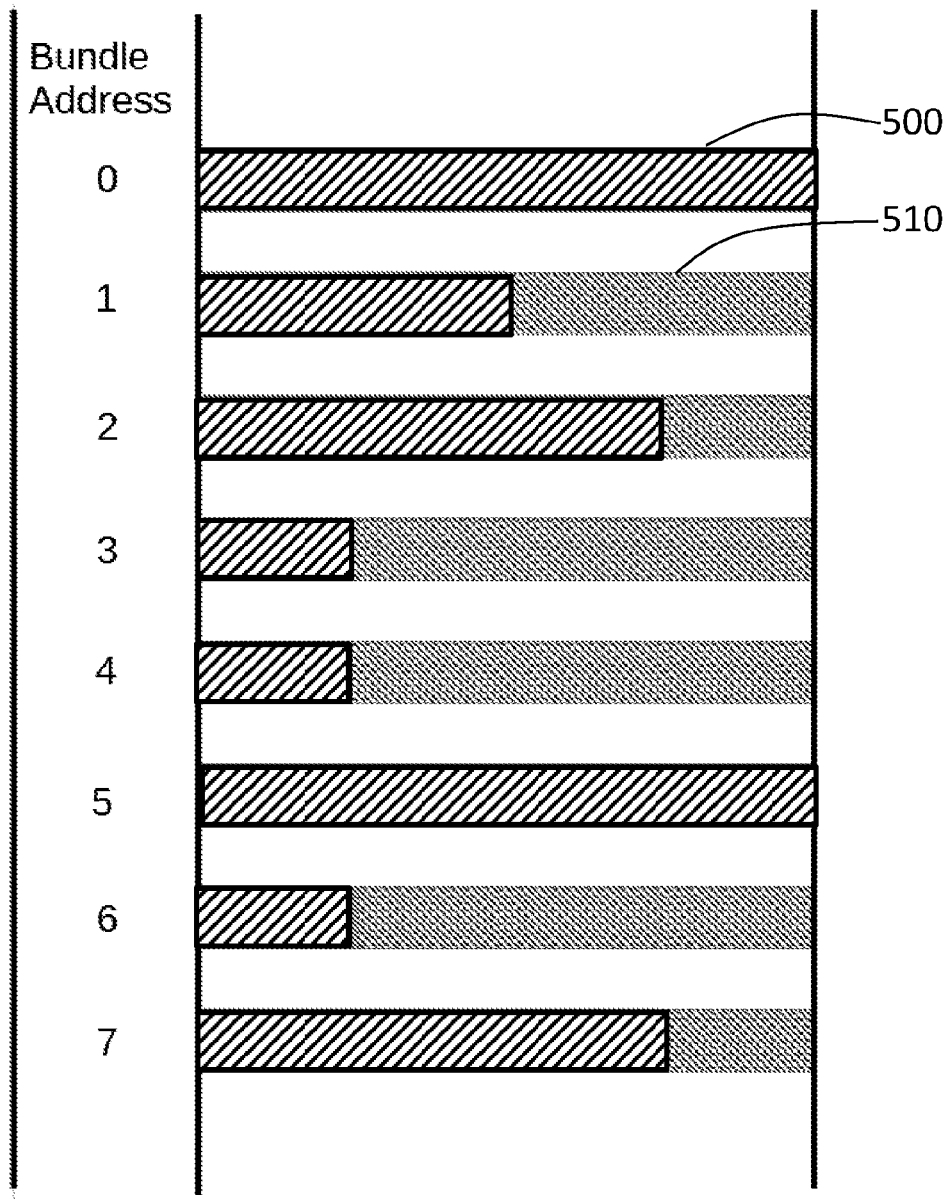
FIG. 5 schematically represents an example of memory occupancy.

That is, in FIG. 6, bundles of a similar size are grouped together in respective different-width instruction queues (or more generally, instruction storage), with different bundle sizes placed in separate memory modules so they can collectively have a higher packing density than the implementation represented by FIG. 5.

Instruction output triggers 610, being signals from trigger circuitry 615 are extended (with respect to those described with reference to FIG. 2) to incorporate a "way" number or other indication, indicating the size of the bundle which will be triggered next thereby simplifying the retrieval of the relevant bundle. The "way" number is also provided to a multiplexer 620 so that program instructions provided by the relevant queue of instruction storage 600 are routed for decoding and execution.

The actual sizing of the queues in the instruction storage 600 may depend on the mix of bundle sizes in profiled programs. Routing circuitry 625 operates under the control of, for example, signals or data provided by the compiler in order to route instructions into the appropriate queue of the instruction storage 600 for queueing, thereby routing a group of program instructions to an instruction queue selected from a plurality of instruction queues, the instruction queue being configured to selectively provide the group of program instructions in parallel for execution. Note that the present arrangements of bundling and the provision of the queues of the instruction storage 600 provide for the possibility that a particular bundle may comprise one instruction, but also explicitly provide for the possibility of multi-instruction bundles. In the case that a bundle comprises more than one instruction, the instruction storage is configured to provide more than one instruction (such as 2, 3 or 4 instructions) for execution in parallel. Note that under the control of the compiler, a bundle of 1 or 2 instructions may be routed by the routing circuitry 625 to the 4-instruction queue, depending on the storage needs of other bundles at that processing stage.

It is not a requirement that a queue is provided to hold the whole of a bundle, but in example arrangements the bundles can be compiled as discussed below to be no larger than the largest width queue provided by the circuitry.

The queues may have a depth of one or more bundles, but in example embodiments the queues have a depth of at least two bundles, so that when a bundle is provided by a queue for execution, another bundle is already queued and ready to become the new head of the queue.

Note that multiple instruction decode units 630 shown in FIG. 6 might be absent in embodiments where it can be more efficient to store bit patterns corresponding to previously decoded instructions in a storage area in the front-end (which can then be accessed in parallel instead of replicating the instruction decoding hardware unit several times). In addition, in some embodiments, both approaches might be present and a special storage area which might contain previously decoded bundles (obtained a priori during the compilation phase or upon decoding earlier instances of bundled instructions) can be used to reduce the power requirements of the front-end or the pipeline depth in some instances by skipping the decode stage.

The trigger circuitry 615 is used to evaluate the current state of the processing element (possibly using data from the result bus and channel occupancy information and/or accessing a predicate store (not shown) as discussed above), to determine which bundle's trigger conditions have been satisfied, to select the triggered bundle from instruction memory and to control the multiplexer 620 for routing of the selected bundle.

Execution is performed with respect to values held by a register file 635 and input channels 640, routed to execution circuitry 645 by a schematic multiplexer 650. Execution results are presented on a result bus 655 from which they can be routed to output channels 660, back to the register file 635 and/or to the trigger circuitry 615.

FIG. 6 therefore provides an example in which the instruction storage 600 comprises at least two instruction queues each configured to provide a group of program instructions for execution, the instruction queues comprising a first instruction queue configured to provide a group of up to n program instructions for execution in parallel and a second instruction queue configured to provide a group of up to m program instructions in parallel for execution, where m is not equal to n. For example, m and n may be considered to be any one each of the values 1, 2 and 4 in the example of FIG. 6.

In this example, the trigger circuitry 615 is responsive to the generation of a trigger state by execution of program instructions and to a trigger condition associated with a given instruction queue of the at least two instruction queues of the instruction storage 600, to control 610 the given instruction queue to provide queued program instructions for execution.

The arrangement also shows routing circuitry 625 configured to route a group of program instructions to a selected one of the instruction queues; and a plurality of execution paths 630, 645 to execute in parallel a number (four in the example of FIG. 6) of program instructions, the number (four in this example) being greater than or equal to the largest number of program instructions (again, four in this example) provided in parallel by any of the instruction queues of the instruction storage 600. In other embodiments, for example, the number could be 7 so that bundles from each queue can be executed in parallel.

FIG. 6 (and indeed FIG. 7 or 8) therefore provides an example of circuitry comprising: processing circuitry 630, 645 configured to execute program instructions in dependence upon respective trigger conditions matching a current trigger state and to set a next trigger state in response to program instruction execution; the processing circuitry comprising: instruction storage 600 configured to selectively provide a group of two or more program instructions for execution in parallel; and trigger circuitry 615 responsive to the generation of a trigger state by execution of a group of program instructions and to a trigger condition associated with a given group of program instructions, to control the instruction storage to provide program instructions (for example, of the given group of program instructions) for execution.

Register File Considerations

FIG. 6 provides a common or monolithic register file 635. So, although the arrangement provides multiple execution paths represented in FIG. 6 by the decoding stages 630 and the execution circuitry 645, the arrangement of FIG. 6 provides a set of processor registers common to execution of program instructions by any of the execution paths, which is to say a set of processor registers, to execution of program instructions within a group of program instructions, the set of processor registers being accessible during execution of the program instructions.

However, this arrangement in turn creates a challenge in realistic designs because the register file 635 may have a high number of read and write ports: for example, 12 read ports and 4 write ports in one embodiment. This potentially prohibitive cost arises because each execution slot should ideally be able to access up to 3 source operands simultaneously and the bandwidth of the datapaths at the back-end which exit the functional units and supply forwarding paths and register write circuitry needs to be high enough to avoid introducing stalls. Several potential solutions exist.

In some example embodiments, operations such as multiply-and-accumulate "mla" which require 3 source operands can be restricted to a small number of pipelines (execution paths) and other pipelines might only support register file accesses for one or two source operands. This scheme can reduce the overall port count but can potentially impair flexibility and performance. In this example, therefore, at least one of the execution paths is configured for execution of program instructions having up to a first number of operands, and at least another of the execution paths is configured for execution of program instructions having up to a second number of operands, the first and second numbers being different. For example, the first and second numbers of operands may be 2 and 3.

Partitioned Register File

Another embodiment using a partitioned register file will now be described with reference to FIG. 7. Here, features common with the arrangement of FIG. 6 are given the same reference numerals and will not be described again in detail.

Figure 7:
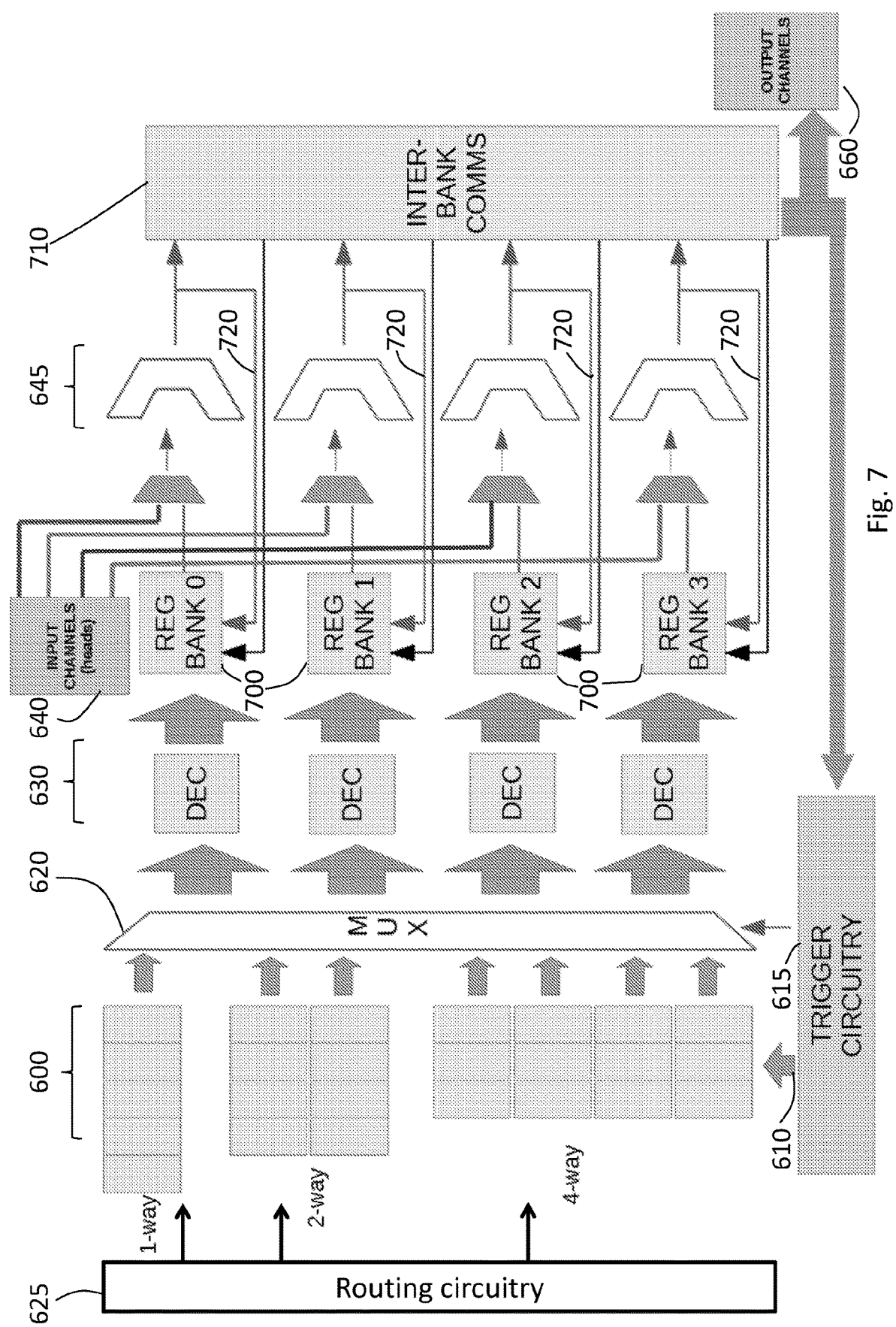

The arrangement of FIG. 7 provides at least two sets of processor registers (shown in FIG. 7 as "Reg Bank n" 700, where n=0, 1, 2 or 3), one set for each of the execution paths, the set of processor registers for a given execution path being accessible during execution of program instructions by that execution path, and communication circuitry 710 to communicate data between the set of processor registers.

In this embodiment, during the compilation phase, the register allocator can be restricted so that all instructions which share the same slot or execution path have a common portion of the register file (bank n) between them but explicit "register moves" are required to transfer information between banks using the inter-bank communication circuitry 710. In this scheme, lines 12 to 23 of the code shown previously can be rewritten as follows:

| 12 | * set p = 1100 : when p == 1000 |
| 13 | mul z1__0, ich0, ich1 |
| 14 | add z2__1, ich2, ich3 |
| 15 | mul z3__2, ich0, ich2 ; deq ich0, deq ich2 |
| 16 | sub z4__3, ich1, ich3 ; deq ich1, deq ich3 |
| 17 | * |
| 18 | * set p = 1101 : when p == 1100 |
| 19 | [ mov z2__0, z2__1 ; mov z3__3, z3__2 ; mov z5__2, z5__0 ; mov z6__2, z6__3 ] |
| 20 | max z5__0, z1__0, z2__0 |
| 21 | sub r1__1, r1__1, #1 |
| 22 | sub och0, z5__2, z6__2 |
| 23 | min z6__3, z3__3, z4__3 |
| 24 | * |

It can be seen that the instructions within one of the bundles have been "reordered" in order to reduce the number of inter-bank data movement operations. In the register notation used here, suffixes "__0", "__1", "__2" and "__3" identify the respective register bank containing the register. The explicit move operations required to support instruction-bundling are shown on line 19.

In FIG. 7, there are four input channels 640 which are not banked like the register file. This is because the input channels are typically much smaller in number relative to the main register file and are "read-only", so this might be an acceptable trade-off. In addition, data sent to the 4 output channels is never read back so banking can be avoided in some embodiments. However, in other examples, the input channels may also be banked in the same manner as the register file.

Note that a return path 720 allows the results of execution by a particular execution path to be written back to the register bank associated with that execution path without the need for additional operations using the inter-bank communication circuitry 710.

Figure 8:
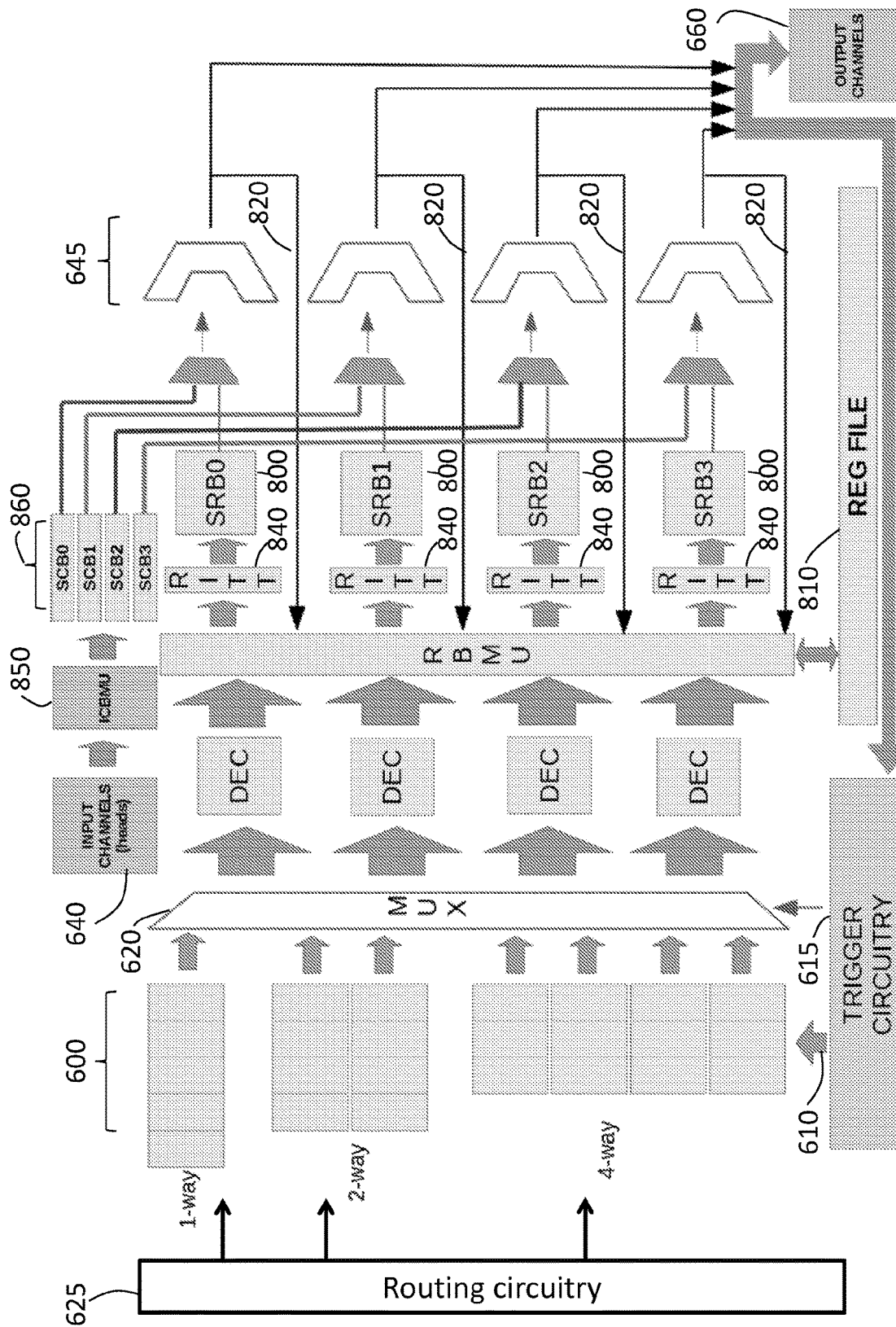

In another embodiment using a partitioned register file, shown in FIG. 8, a further example of a register access scheme provides for a bundled triggered instruction set architecture which reduces the number of read ports required for the register file whilst at the same time enabling parallel access by multiple slots or execution paths.

Once again, features in common with FIG. 6 or 7 use the same numbers and will not be described further in detail.

Unlike the scheme of FIG. 7, however, in FIG. 8 no explicit move operations are required to maintain coherency between the slots or execution paths. In this scheme, each slot has a small local register file called a Slot Register Buffer (SRB0 . . . 3) 800 which keeps copies of operands retrieved from the main register file 810 (common to all paths) or written by previous data processing operations performed by that execution path (note that there is a return route 820 for data generated by a given execution path).

There are many possible techniques for managing the information flowing into or out of such structures and one approach is set out below. By keeping each SRB 800 small relative to the main register file 810 and limiting the number of read ports each one has, it is possible to handle the concurrency opportunities of the bundle whilst staying within a reasonable power envelope.

A Register Buffer Management Unit (RBMU) 830 is responsible for moving data between the main register file 810 and each SRB 800. Whenever a slot tries to read a register value from its respective SRB 800, it consults a respective small local structure called a Register Index Translation Table (RITT) 840 and if a valid entry is found, it uses the corresponding index stored in the RITT 840 to retrieve the actual value from the SRB 800. The RITT 840 might be implemented using latches in some embodiments. The indirection of RITT structure is employed in order to ensure that the SRB 800 can be compact and fully-associative, but at the same time not introduce a large number of expensive comparators in a potential critical path. If a valid entry is not found, then one might be obtained by accessing another SRB 800 (that is to say, for another path) directly. If no other SRB has a valid entry, then the register read value is obtained from the main register file 810. The newly retrieved value is placed in the SRB 800 of the requesting slot. An entry is also created in the corresponding RITT 840 with the valid bit set to true. As can be expected, at the start of a program comprising bundled instructions, many read values will have to be sourced directly from the main register file 810. These accesses might initially incur delays due to the limited number of read ports available for accessing the main register file 810. However, as the program progresses further and starts to iterate over certain bundled trigger instructions, more accesses might be serviced by the SRBs 800 than the main register file thereby potentially improving parallelism.

The RBMU 830 broadcasts any updates to a specific register to all SRBs 800 which have a copy of that register. This broadcast scheme is valid because only one functional unit is permitted to write to each destination register within a bundle. A "modified" bit would be set at the corresponding location to ensure that the relevant entry in the SRB 800 would be written to the main register file if it is evicted later on. Such evictions would occur due to capacity issues when a new value is about to be added to the SRB, and to make the process efficient: usage tracking might be performed using access counters. Entries with low usage can be evicted. If there is currently no entry in any SRB matching a register being written, then the value is written to the main register file.

The foregoing description of multi-level register storage structures would be less acceptable in conventional processors because of the additional delay these structures would introduce upon encountering a speculation failure or an exception. The architectural register state can only be made visible by potentially draining all the SRBs which can be an expensive and time-consuming operation. However, the proposed structures are considered to be not only acceptable but advantageous in the present use case because the primary purpose of the bundled trigger instruction architecture is flexible multi-domain spatial acceleration. In the present use-case, there are few requirements for general aims which mirror those applicable to conventional processors such as abundant speculation, precise exceptions, and fast exception entry capability.

In FIG. 8, there is a hardware structure called an Input Channel Buffer Management Unit (ICBMU) 850 which acts in a manner similar to the RBMU and can transfer incoming data from channels to small storage areas called Slot Channel Buffers (SCB0 . . . 3). 860 However, unlike the SRBs which are fully associative, each SCB can be direct-mapped because the input channels are much smaller in number relative to the main register file. In addition, fewer ports might be needed for each SCB relative to an SRB because instructions reading up to 3 channels simultaneously are rare. Furthermore, input channels are "read-only" so the ICBMU does not need to have as much coherence functionality as the RBMU. Its key purpose is to listen for "dequeue" and "channel read" events and whenever a dequeue operation happens at the end of a bundle, the new data at the corresponding channel's head is propagated to all the slots which have read from that channel recently. No evictions are necessary because the SCB is a direct-mapped structure.

Information going from the execution units to the output channels does not have to traverse any special management unit because there are no critical events requiring synchronisation between the data in transit in the backend and the output channels. Additionally, the two premises that only one writer per channel is permitted within a bundle, and that data is never read back by the triggered processing element's functional units from these channels, can further simplify the construction of output pathways required to support bundling.

FIG. 8 therefore illustrates a set of processor registers 810 common to execution of program instructions by any of the execution paths; buffer circuitry 800 for each execution path to store a copy of data held by one or more of the processor registers; and control circuitry 830, 840 to control copying of data between the set of processor registers and the buffer circuitry. As mentioned above, in some examples, the results of execution by any execution path may be written directly back to the buffer circuitry 800 associated with that execution path.

Processing Array

The arrangement of FIG. 1, when implemented using circuitries according to any of the present example embodiments, provides an example of a processing array comprising: an array of such circuitries; and data communications circuitry 140, 150 to communicate data between circuitries of the array.

Compiler Example

Figure 9:
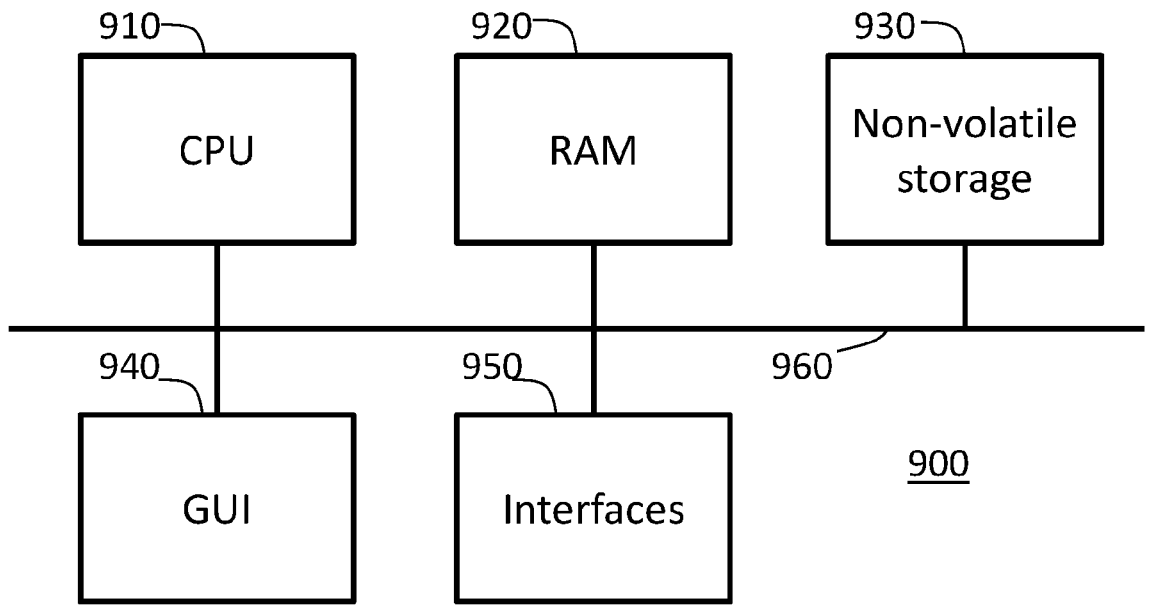
FIG. 9 schematically illustrates an example data processing apparatus.

An example arrangement illustrating a compiler embodiment will now be described with reference to FIGS. 9 and 10. Here, FIG. 9 schematically illustrates a data processing apparatus 900 which can be used to execute compiler operations to generate bundled program code as described above, for example according to a method to be described with reference to FIG. 12 below. It is noted that any of the circuitry previously described a be used to execute compiler operations but that in at least some examples, general-purpose data processing apparatus such as the apparatus 900 may be used.

The apparatus 900 comprises one or more processing elements or central processing units (CPUs) 910, random access memory 920, non-volatile storage 930 such as Flash memory, an optical or magnetic disk, a read-only memory or the like (forming an example of a machine-readable non-transitory storage medium by which computer software to perform the compiler operations described here may be provided or stored), a graphical user Interface 940 such as one or more of a display, a keyboard, a pointing control or the like and one or more other interfaces 950 such as a network interface, all interconnected by a bus structure 960. In operation, program instructions to perform the compiler or other functions are read from the non-volatile storage 930 and executed by the CPU 910 in cooperation with the random access memory 920.

Figure 10:
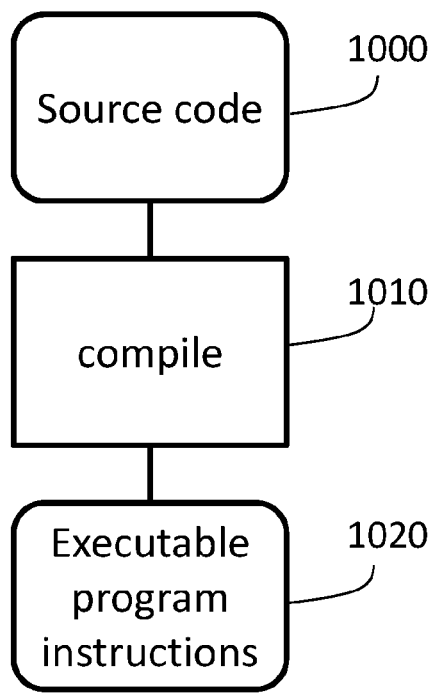
FIG. 10 schematically represents the operation of a compiler.
Figure 12:
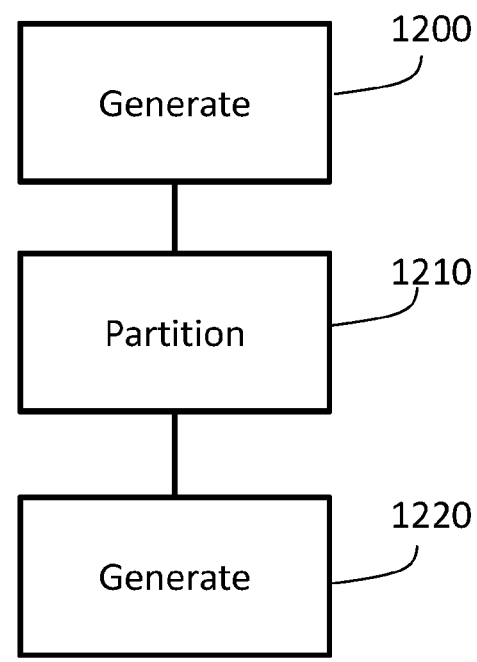

FIG. 10 schematically illustrates a compilation operation in which source code 1000 is compiled by a compile operation 1010, for example using the process described with reference to FIG. 12 to generate executable program instructions 1020.

Summary Methods

Figure 11:
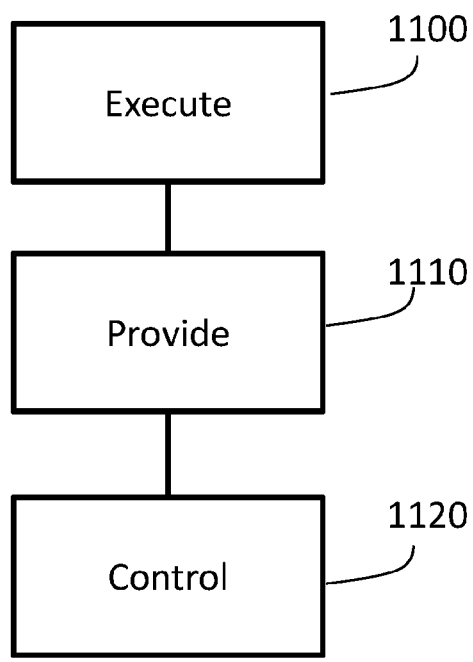
FIGS. 11 and 12 are schematic flowcharts illustrating respective methods.

By way of summary of the techniques discussed above, FIG. 11 is a schematic flowchart illustrating a method (which can, for example, be implemented by the circuitry described above) comprising:

executing (at a step 1100) program instructions in dependence upon respective trigger conditions matching a current trigger state and to set a next trigger state in response to execution of a program instruction;

providing (at a step 1110), by instruction storage, a group of two or more program instructions for execution in parallel; and in response to the generation of a trigger state by the execution of program instructions and to a trigger condition associated with a given group of program instructions, controlling (at a step 1120) the instruction storage to provide program instructions of the given group of program instructions for execution.

By way of further summary of the techniques discussed above, FIG. 12 is a schematic flowchart illustrating a computer-implemented method comprising:

generating (at a step 1200) program instructions for execution in dependence upon respective trigger conditions, execution of a program instruction setting a next trigger condition;

partitioning (at a step 1210) the program instructions into groups of program instructions, at least some groups containing more than one program instruction in which a program instruction within a given group does not depend on the outcome of another program instruction in the given group; and generating (at a step 1220) an input trigger condition and an output trigger state for each group; the input trigger condition being a condition which, when fulfilled, enables execution of the program instructions of that group, and the output trigger condition being a condition for generation in response to completion of execution of all of the program instructions in that group.

In example arrangements, each of the steps 1200, 1210, 1220 may be implemented by a computer such as the apparatus of FIG. 9 operating under the control of computer software (which may in turn be stored by the non-volatile storage 930).

Simulation Embodiment

Figure 13:
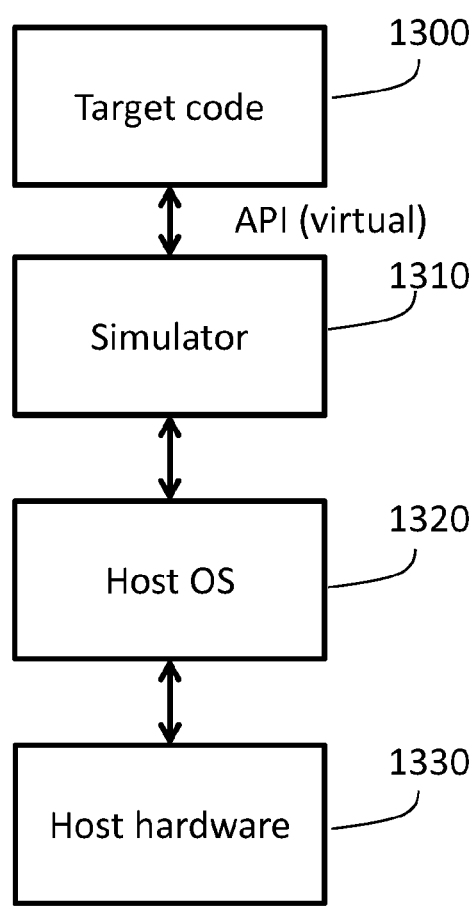
FIG. 13 schematically represents a simulation embodiment.

FIG. 13 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1330, optionally running a host operating system 1320, supporting the simulator program 1310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in reference [2] cited below.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1330), some simulated embodiments may make use of the host hardware, where suitable.

The simulator program 1310 may be stored on a computer-readable storage medium (which may be a non-transitory medium), and provides a program interface (instruction execution environment) to the target code 1300 (which may include applications, operating systems and a hypervisor) which is the same as the interface of the hardware architecture being modelled by the simulator program 1310. Thus, the program instructions of the target code 1300, including instructions providing processing program logic configured to execute program instructions in dependence upon respective trigger conditions matching a current trigger state and to set a next trigger state in response to program instruction execution; the processing program logic comprising: instruction storage program logic configured to selectively provide a group of two or more program instructions for execution in parallel; and trigger program logic responsive to the generation of a trigger state by execution of program instructions and to a trigger condition associated with a given group of program instructions, to control the instruction storage program logic to provide program instructions for execution described above, may be executed from within the instruction execution environment using the simulator program 1310, so that a host computer 1330 which does not actually have the hardware features of the apparatus discussed above can emulate these features.

Accordingly, example embodiments can provide a virtual machine computer program comprising instructions for controlling a host data processing apparatus to provide an instruction execution environment comprising processing program logic configured to execute program instructions in dependence upon respective trigger conditions matching a current trigger state and to set a next trigger state in response to program instruction execution; the processing circuitry comprising: instruction storage program logic configured to selectively provide a group of two or more program instructions for execution in parallel; and trigger program logic responsive to the generation of a trigger state by execution of program instructions and to a trigger condition associated with a given group of program instructions, to control the instruction storage program logic to provide program instructions for execution.

SUMMARY

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

REFERENCES

[1] A. Parashar et al., "Efficient Spatial Processing Element Control via Triggered Instructions," in *IEEE Micro*, vol. 34, no. 3, pp. 120-137, May-June 2014, doi: 10.1109/MM.2014.14.

[2] R. Bedichek, "Some Efficient Architecture Simulation Techniques", in Winter 1990 USENIX Conference, Pages 53-63.

The invention claimed is:

1. Circuitry comprising:
processing circuitry configured to execute program instructions in dependence upon respective trigger conditions matching a current trigger state and to set a next trigger state in response to program instruction execution; the processing circuitry comprising:
instruction storage configured to selectively provide a group of two or more program instructions for execution in parallel; and
trigger circuitry responsive to the generation of a trigger state by execution of program instructions and to a trigger condition associated with a given group of program instructions, to control the instruction storage to provide program instructions of the given group of program instructions for execution,
wherein the instruction storage comprises at least two instruction queues each configured to provide a group of program instructions for execution, the instruction queues comprising a first instruction queue configured to provide a group of up to n program instructions for execution in parallel and a second instruction queue configured to provide a group of up to m program instructions in parallel for execution, where m is not equal to n.

2. The circuitry of claim 1, in which the trigger circuitry is responsive to the generation of a trigger state by execution of program instructions and to a trigger condition associated with a given instruction queue of the at least two instruction queues, to control the given instruction queue to provide queued program instructions for execution.

3. The circuitry of claim 1, comprising routing circuitry configured to route a group of program instructions to a selected one of the instruction queues.

4. The circuitry of claim 1, comprising a plurality of execution paths to execute in parallel a number of program instructions, the number being greater than or equal to the largest number of program instructions provided in parallel by any of the instruction queues.

5. The circuitry of claim 4, comprising a set of processor registers common to execution of program instructions within a group of program instructions, the set of processor registers being accessible during execution of the program instructions.

6. The circuitry of claim 4, comprising:
at least two sets of processor registers, one set for each of the execution paths, the set of processor registers for a given execution path being accessible during execution of program instructions by that execution path; and
communication circuitry to communicate data between the sets of processor registers.

7. The circuitry of claim 4, comprising:
a set of processor registers common to execution of program instructions by any of the execution paths; buffer circuitry for each execution path to store a copy of data held by one or more of the processor registers; and
control circuitry to control copying of data between the set of processor registers and the buffer circuitry.

8. The circuitry of claim 4, in which at least one of the execution paths is configured for execution of program instructions having up to a first number of operands, and at least another of the execution paths is configured for execution of program instructions having up to a second number of operands, the first and second numbers being different.

9. The circuitry of claim 1, in which the processing circuitry comprises vector processing circuitry configured to execute two or more vector processing instructions in parallel, each vector processing instruction applying a respective processing operation to a respective vector of two or more data elements.

10. A processing array comprising:
an array of the circuitries of claim 1; and
data communications circuitry to communicate data between circuitries of the array.

11. A method comprising:
executing program instructions in dependence upon respective trigger conditions matching a current trigger state and to set a next trigger state in response to execution of a program instruction;
by instruction storage comprising at least two instruction queues comprising a first instruction queue configured to provide a group of up to n program instructions for execution in parallel and a second instruction queue configured to provide a group of up to m program instructions in parallel for execution, where m is not equal to n, providing a group of two or more program instructions for execution in parallel; and
in response to the generation of a trigger state by the execution of program instructions and to a trigger condition associated with a given group of program instructions, controlling the instruction storage to provide program instructions of the given group of program instructions for execution.

12. A computer-implemented method comprising:
generating program instructions in instruction storage for execution in dependence upon respective trigger conditions, execution of a program instruction setting a next trigger condition;
partitioning the program instructions into groups of program instructions, at least some groups containing more than one program instruction in which a program instruction within a given group does not depend on the outcome of another program instruction in the given group, the instruction storage comprising at least two instruction queues comprising a first instruction queue configured to provide a group of up to n program instructions for execution in parallel and a second instruction queue configured to provide a group of up to m program instructions in parallel for execution, where m is not equal to n; and
generating an input trigger condition and an output trigger state for each group, the input trigger condition being a condition which, when fulfilled, enables execution of the program instructions of that group, and the output trigger condition being a condition for generation in response to completion of execution of all of the program instructions in that group.

13. The method of claim 12, comprising, for one or more input channels providing input data for execution of a group, generating one or more operations to dequeue the input data from the one of more input channels after execution of the program instructions of the group.

14. The method of claim 12, comprising routing a group of program instructions to an individual processor of an array of processors.

15. The method of claim 12, comprising routing a group of program instructions to an instruction queue selected from a plurality of instruction queues, the instruction queue being configured to provide the group of program instructions in parallel for execution.

16. A compiler comprising computer program code which, when executed by a computer, causes the computer to perform the method of claim 12.

17. A non-transitory machine-readable storage medium which stores the compiler of claim 16.

\* \* \* \* \*